United States Patent
Bajic et al.

(10) Patent No.: US 8,102,398 B2
(45) Date of Patent: Jan. 24, 2012

(54) DYNAMICALLY CONTROLLED POWER REDUCTION METHOD AND CIRCUIT FOR A GRAPHICS PROCESSOR

(75) Inventors: Ljubisa Bajic, Toronto (CA); James Fry, Aurora (CA)

(73) Assignee: ATI Technologies ULC, Markham, Ontario (CA)

( * ) Notice: Subject to any disclaimer, the term of this patent is extended or adjusted under 35 U.S.C. 154(b) by 705 days.

(21) Appl. No.: 11/366,619

(22) Filed: Mar. 3, 2006

(65) Prior Publication Data

US 2007/0206018 A1 Sep. 6, 2007

(51) Int. Cl.
*G06T 1/00* (2006.01)
*G06F 1/26* (2006.01)

(52) U.S. Cl. .................... 345/503; 713/320

(58) Field of Classification Search .......... 345/503; 713/320
See application file for complete search history.

(56) References Cited

U.S. PATENT DOCUMENTS

| | | | |
|---|---|---|---|
| 5,627,412 A * | 5/1997 | Beard | 307/82 |
| 5,657,478 A * | 8/1997 | Recker et al. | 345/503 |
| 5,996,083 A * | 11/1999 | Gupta et al. | 713/322 |
| 6,072,498 A * | 6/2000 | Brittain et al. | 345/428 |
| 6,216,235 B1 * | 4/2001 | Thomas et al. | 713/501 |
| 6,460,125 B2 * | 10/2002 | Lee et al. | 711/167 |
| 6,691,236 B1 * | 2/2004 | Atkinson | 713/320 |
| 6,792,379 B2 * | 9/2004 | Ando | 702/130 |
| 6,938,176 B1 * | 8/2005 | Alben et al. | 713/323 |
| 6,950,105 B2 | 9/2005 | Giemborek et al. | |
| 7,149,909 B2 * | 12/2006 | Cui et al. | 713/322 |
| 7,234,144 B2 * | 6/2007 | Wilt et al. | 718/104 |
| 7,263,622 B2 * | 8/2007 | Ohba | 713/323 |
| 7,426,320 B2 * | 9/2008 | Stevens | 382/307 |
| 2001/0056450 A1 * | 12/2001 | Kiriaki | 708/300 |
| 2003/0140179 A1 * | 7/2003 | Wilt et al. | 709/321 |
| 2003/0210247 A1 * | 11/2003 | Cui et al. | 345/534 |
| 2003/0222876 A1 * | 12/2003 | Giemborek et al. | 345/503 |
| 2003/0233592 A1 * | 12/2003 | Lin et al. | 713/320 |
| 2005/0024365 A1 * | 2/2005 | Ohba | 345/501 |
| 2005/0066207 A1 * | 3/2005 | Fleck et al. | 713/320 |
| 2005/0068311 A1 * | 3/2005 | Fletcher et al. | 345/211 |
| 2005/0076256 A1 * | 4/2005 | Fleck et al. | 713/320 |
| 2005/0223249 A1 * | 10/2005 | Samson | 713/320 |
| 2005/0268141 A1 * | 12/2005 | Alben et al. | 713/500 |
| 2005/0271361 A1 * | 12/2005 | Aoki et al. | 386/68 |
| 2005/0280463 A1 * | 12/2005 | Chih | 327/538 |
| 2006/0150071 A1 * | 7/2006 | Chen | 715/500.1 |

* cited by examiner

*Primary Examiner* — Daniel Washburn (57) ABSTRACT

A graphics processor may be operated in a reduced power mode to render frames at rate equal to or less than the rate at which frames are presented on an interconnected display. Graphics processor clock speeds are controlled to reduce the time during which the graphics processor is idle between rendering frames. The graphics processor clock speed may thus be slowed without impacting the quality of rendered images. At the same time the voltage applied to power the graphics processor may be reduced. Optionally, a back bias voltage may further be applied to the processor substrate to reduce power consumption. Clock speed and voltage levels may be adjusted using closed-loop control.

24 Claims, 6 Drawing Sheets

FIG. 8

DYNAMICALLY CONTROLLED POWER REDUCTION METHOD AND CIRCUIT FOR A GRAPHICS PROCESSOR

FIELD OF THE INVENTION

The present invention relates generally to power reduction in computing devices, and more particularly to methods and circuits for reducing power consumed by a graphics processor.

BACKGROUND OF THE INVENTION

Modern computing device design strives to reduce the electrical power consumed by individual computing components, and subsystems. Reduced power consumption, in turn allows the computing device to operate at reduced temperatures and higher speeds. Moreover, it allows the computing device to operate for longer periods of time using battery or similar energy sources. This in turn, allows the devices to be more portable.

Known power reduction techniques include shutting down components and subsystems, and reducing operating frequencies of clocked circuits during times of no operation. Computer graphics adapters, for example, are shut down or operated at reduced frequency when not in use.

These conventional power management techniques, however, are mainly focused on a usage model that requires portions of the computing device to become fully idle for periods of time.

Newer computer operating systems, such as Microsoft's next generation desktop operating system (VISTA), are expected to extensively use 3D rendering as a normal part of the creation of a standard desktop view. In addition, it is expected that 2D and 3D rendering in the form of animations will run continuously even without user interaction.

In the presence of continuous rendering, the utility of existing power techniques is reduced drastically. Specifically, the continuous rendering may prevent the graphics processor from ever being idle, thus inhibiting the majority of the current power management features.

Clearly then, continuous high speed rendering in the absence of user interaction is wasteful. Accordingly, improved power management methods and components are desirable.

SUMMARY OF THE INVENTION

Exemplary of embodiments of the present invention, a graphics processor is operated to render frames at rate equal to or less than the rate at which frames are presented on an interconnected display. Graphics processor clock speeds are controlled to reduce the time during which the graphics processor is idle between rendering frames. In this way, the graphics processor clock speed may be slowed without impacting the quality of rendered images. At the same time the voltage applied to power the graphics processor may be reduced. Optionally, a back bias voltage may further be applied to the processor substrate to reduce power consumption. Clock speed and voltage levels may be adjusted using closed-loop control.

In accordance with an aspect of the present invention, there is provided a method of operating a graphics accelerator that includes, in response to detecting a desired reduced power mode, limiting a frame rendering rate of a graphics processor to an adjusted frame rendering rate equal to or less than a frame refresh rate of a display interconnected with the graphics processor rendering graphics to be displayed on the display, at the adjusted frame rendering rate; and controlling operation of the graphics processor so that idle time of the graphics processor between rendering frames is controlled.

In accordance with another aspect of the present invention, a graphics accelerator includes a graphics engine for rendering graphical images to be displayed on a display; an adjustable clock source, for providing an operating clock signal to the graphics engine; a controller in communication with the graphics engine and the adjustable clock source, to control a frequency of the adjustable clock source so that the graphics engine remains idle for a desired time between frames as the graphics engine renders frames.

In accordance with yet a further aspect of the present invention, a computing device includes means for rendering graphics frames; means for, in response to detecting a reduced power condition, limiting a frame generation rate of the means for rendering to an adjusted frame generation rate equal to or less than a frame refresh rate of a display interconnected with the means for rendering; means for controlling operation of the means for rendering so that idle time of the means for rendering between rendered frames is reduced.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
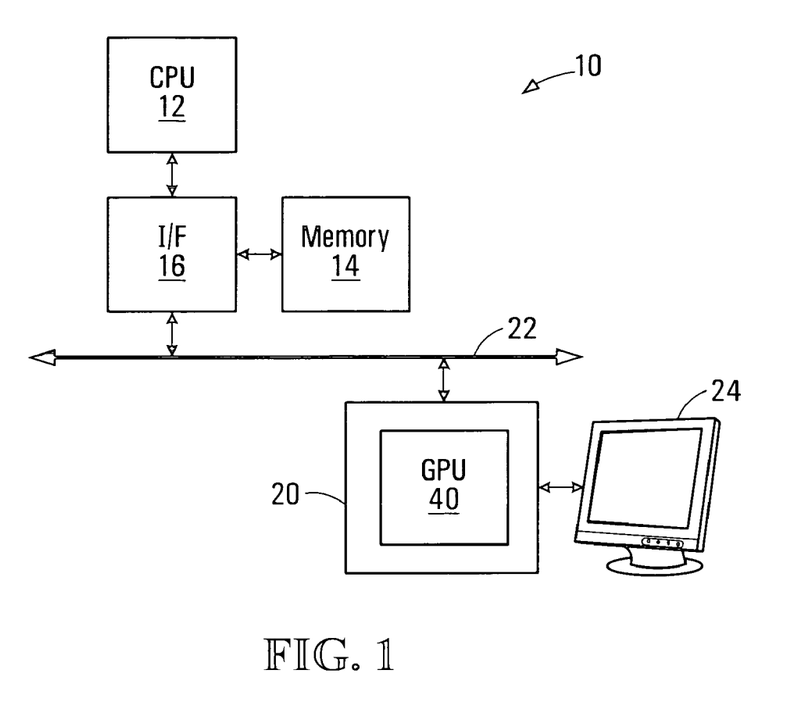
FIG. 1 is a simplified schematic block diagram of a computing device and graphics accelerator exemplary of an embodiment of the present invention.

FIG. 1 is a simplified schematic block diagram of a computing device exemplary of an embodiment of the present invention. Computing device 10 is based on a conventional Intel x86 architecture. However, as will become apparent, the present invention may easily be embodied in computing devices having any suitable architecture. Example computing devices could for example, be based on a PowerPC, RISC or other architecture. Similarly, a computing device embodying the present invention may take the form of a mobile device, such as a laptop, portable telephone, personal digital assistant (PDA), portable video player, or the like.

Example computing device 10 includes a host processor 12, interconnected to system memory 14 and peripherals through integrated interface circuit 16. In example computing device 10, host processor 12 is a conventional central processing unit and may for example be a microprocessor compatible with the INTEL™x86 family of microprocessors.

Integrated interface circuit 16 provides an interface for host processor 12 to peripherals and memory. As illustrated, interface circuit 16 interconnects host processor 12 and system memory 14 by way of a memory bus; and a graphics accelerator 20 by way of a bus 22. Bus 22 may be a high speed expansion bus, such as the PCI-express, AGP bus, or other suitable bus for interfacing a graphics accelerator 20 to host processor 12. Computing device 10 may further include additional components that are not specifically illustrated. These may include, without limitation, expansion slots on bus 22; input/output peripherals interconnected by way of one or more peripheral interface circuits; one or more lower speed expansion buses; additional graphics adapters; network adapters and the like.

In the context of an x86 based computing device, graphics accelerator 20 may take the form of a multi-purpose, programmable computer graphics adapter. If the invention used in another device graphics accelerator 20 may take the form of a custom, limited purpose ASIC used to render video/graphics for an interconnected display.

Graphics accelerator 20 is interconnected to a display 24 in the form of a monitor, LCD panel, television, integrated display panel, or any other display. Graphics accelerator 20 may be formed as a peripheral expansion card, resident in an expansion slot on bus 22. As will be appreciated, graphics accelerator 20 could form part of device 10 by virtue of being integrated into interface circuits 16, or being otherwise in communication with host processor 12. Optionally, one or more additional graphics accelerator(s) (not illustrated) may further form part of computing device 10.

Figure 2:
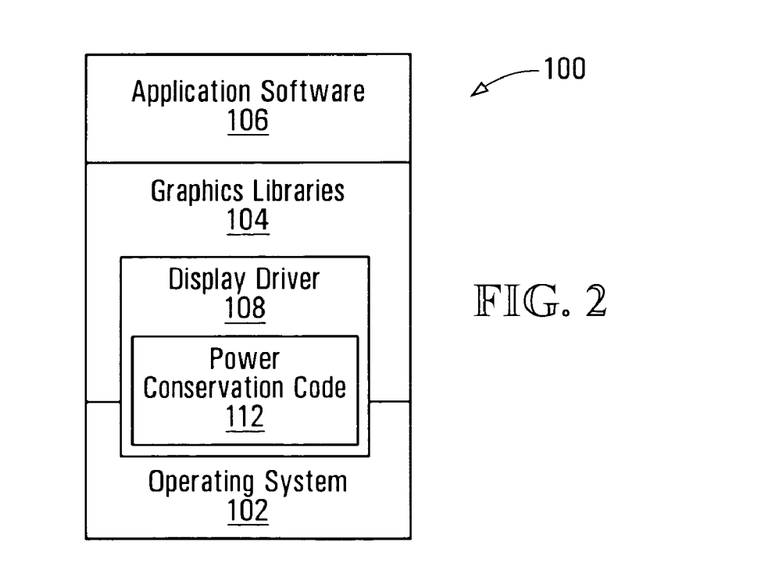
FIG. 2 is a simplified block diagram of software in the computing device of FIG. 1.

In the depicted embodiment, computing device 10 executes software stored within system memory 14. As illustrated in FIG. 2, in the context of an intel x86 architecture, exemplary software 100 may include an operating system 102, graphics libraries 104 and application software 106, stored within system memory 14. Exemplary operating systems include Windows Vista; Windows XP; Windows NT 4.0, Windows ME; Windows 98, Windows 2000, Windows 95, or Linux operating systems. Exemplary graphics libraries may include the Microsoft DirectX libraries and OpenGL libraries, their equivalents, or similar libraries.

System memory 14 (FIG. 1) and interconnected disk drives (not shown) include a suitable combination of random access memory, read-only memory and disk storage memory, used by device 10 to store and execute operating system and graphics adapter driver programs adapting device 10 in manners exemplary of the embodiments of the present invention. Exemplary software 100 (FIG. 2) could, for example, be stored in read-only memory or loaded from a computer readable memory by way of an external peripheral such as a disk drive. Computer readable medium may be an optical storage medium, a magnetic diskette, tape, ROM cartridge or the like.

Graphics libraries 104 or operating system 102 further include graphics driver software 108, used for low-level communication with graphics accelerator 20. The software is layered, with higher level layers using lower layers to provide certain functionality. Applications may make use of operating system 102 and graphics libraries 104 to render 2D or 3D graphics. Render, in this context, includes drawing, presenting, decoding or otherwise creating a graphic image for presentation, and may for example include polygon rendering, ray-tracing, video image decoding, line drawing or the like. Driver 108 may include a power conservation code portion 112 used to control power consumption of graphics accelerator 20, as detailed herein.

As will become, apparent, software exemplary of embodiments of the present invention may form part of graphics libraries 104 and/or driver software 108. In the exemplified embodiment, exemplary software may form part of drivers 108, used to control overall operation of graphics accelerator 20.

Additionally, suitable application software 106 in system memory 14, in communication with driver software 108 to change driver parameters, and thus control the operation of device 10, and particularly graphics accelerator 20.

Of course, if the invention is embodied in computing devices, such as the aforementioned portable telephone, video viewer, PDA or the like, software organization may be significantly different than that depicted in FIG. 2.

Figure 3:
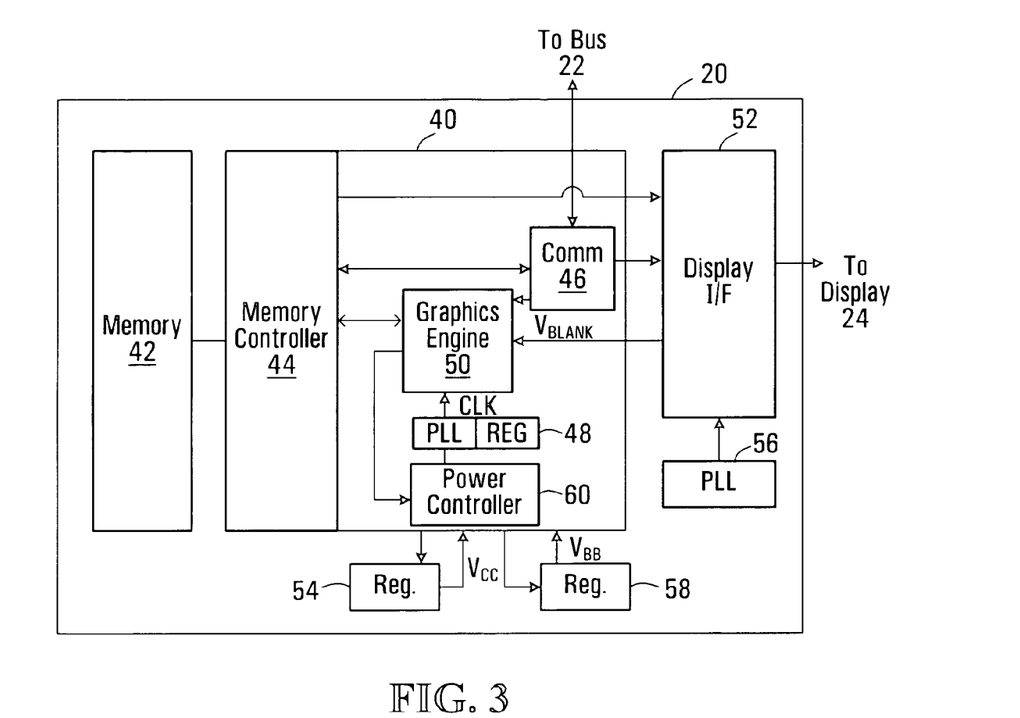
FIG. 3 is a simplified schematic block diagram of the graphics accelerator of the computing device of FIG. 1, exemplary of an embodiment of the present invention.

FIG. 3 is a simplified block diagram of graphics accelerator 20. As illustrated, graphics accelerator 20 includes a graphics processor 40, in communication with local memory 42. At least a portion of local memory 42 is used as one or more frame buffers to store graphics data to be displayed on an interconnected display 24. Example graphics processor 40 includes a memory interface 44; a command processor 46; and at least one graphics engine 50. Programmable clock 48 may be adjusted under software control, by software 100, and provides an operating clock (SCLK) for operation of graphics engine 50. A display interface 52 is in communication with local memory 42 to produce a display from data written to the frame buffer within memory 42. At least one programmable voltage regulator 54 regulates power provided to graphics processor 40.

In the depicted embodiment, graphics processor 40 includes a 2D/3D graphics engine 50. Graphics engine 50 is a specialized integrated circuit including one or more graphics pipelines used to generate data that is used to create two-dimensional and three-dimensional images on a display device. Graphics processor 40 may further or alternatively include special purpose graphics processing components, including graphics engines such as an overlay engine, or video decoder (not shown), including MPEG, or similar decoders, used to generate data used to create the appearance of full-motion video on the display device.

Each graphics engine of graphics processor 40 generates data for display, and stores such data in a portion of local memory 42 acting as a frame buffer. Graphics processor 40 typically operate on image data obtained from a host processor 12 by way of system bus 22, or the frame buffers within memory 42. The memory bus widths of 32, 64, 128 or greater widths can be used. The graphics data stored in the frame buffer(s) is sampled by display interface 52 to create graphic images that appear on the screen of a monitor or LCD panel or other display device, depicted as display 24 in FIG. 1.

In the depicted embodiment, multiple frame buffers are allocated within local memory 42. Specifically, at least first and second frame buffers are allocated. Graphics engine 50 alternately renders to the first and second frame buffers. Display interface 52 similarly alternately displays the first and second frame buffers. The frame buffer containing data representative of a frame currently being displayed is referred to as the front buffer, while the frame buffer to which an image is currently being rendered is referred to as the back buffer. Upon displaying a complete frame on an interconnected display, display interface 52 signals graphics processor 40 that the frame in the current front buffer has been rendered. It may do so by providing graphics processor a signal (VBLANK)

each time a vertical blanking pulse is generated. In response, graphics processor 40 may reprogram display adapter 52 to use the former back buffer as the current front buffer. Similarly, graphics processor 40 may begin to treat the former front buffer as the back buffer and to render the next frame to be displayed in the back buffer. A person of ordinary skill will readily appreciate that more than two frame buffers could be allocated. That is, three or more buffers could be allocated, and use of the multiple buffers as front and back buffers, respectively, could be cycled.

As will further be appreciated, existing software applications, such as those stored as application software 106 are written with the possibility of rendering frames at a rate that is or is not synchronized to the display frame rate. When applications render frames at a rate in excess of the display frame rate, results are often used for benchmarking. In normal use, most applications can render frames at a rate equal to, or less than the display frame rate. For many applications the speed at which frames are rendered is software selectable. That is, application software 106 may use software flags or semaphores to limit their rendering rate to be no higher than the display refresh rate (this is usually referred to as, "wait for vsync") or to render as fast as the graphics hardware is able.

Images to be displayed are typically stored in raster format in the frame buffers in memory 42. Display interface 52, by way of memory controller 38 samples the front frame buffer within local memory 42 and presents an image on one or more video output ports in the form of VGA ports; composite video ports; DVI ports, or the like, for display of one or more video images on video devices such as display 24 (FIG. 1). In this way, images rendered by graphics processor 40 in may be presented.

As will be appreciated display interface 52 may be any suitable interface for converting data within memory for display on a display device. For example, display interface 52 may take the form of a RAMDAC. Display interface 42 is typically programmable, for example through a plurality of registers, allowing driver software 108 or similar software executing on host processor 12 or graphics processor 40 to set the beginning address within system memory 14 to present at its display output. As well, the pixel depth used by display interface 42 (i.e. bits per pixel) and screen resolution are typically programmable. Designation of the front buffer can thus be accomplished by reprogramming of the registers of display interface 52 to point to the then current front buffer.

Typically, each graphics engine, such as engine 50 of graphics processor 40, requires an input clock signals to process data. Programmable clock 48 provides such a clock signal to engine 50. Multiple clock sources could form part of graphics accelerator 20 and graphics processor 40. For example, if graphics processor 40 includes multiple graphics engines, each graphics engine may be capable of operating at different clock speeds, as for example detailed in U.S. Pat. No. 6,950,105, the contents of which are hereby incorporated by reference.

Local memory 42 may similarly be accessed at different rates, controllable by a clock 56 driving display adapter 52. Clock 56 is often referred to as a pixel clock. In general, the amount of power consumed by display interface 52 is proportional to the frequency of the pixel clock used to access the frame buffer. For memory 42 power consumption is typically proportional to the memory clock frequency.

External power regulator 54 may supply an operating voltage to graphics processor 40 (and thus graphics engine 50). Similarly, a second voltage regulator 58 provides a back bias voltage to the bulk substrate forming graphics processor 40.

As will become apparent, clock speed adjustments may occur under the direction and control of software 100 (a computer program, or program portion) executed by host processor 12, via signals on system bus 22. Power conservation can be realized by running the graphics processor more slowly. The faster that graphics processor 40 operates, the greater its processing capability. However, the power that is consumed is directly related to the clock speed or speeds at which graphics processor 40 is operated. Adjustable-speed clock sources for the graphics engines are therefore provided by programmable phase-locked loops (PLLs), such as a PLL of clock 48 which is described more fully below.

Output data from graphics processor 40 is written into or read from the frame buffer in memory 42 (for use by display adapter 52), under the direction of a memory controller 44. Among other things, memory controller 44 determines which portions of the memory 42 are accessed by the 2D/3D engine 50, and which portions act as frame buffer.

In order to match clock speeds to processing requirements, programmable clock 48 is formed as programmable phase-locked loop (PLL). Clock 56, is similarly formed as a PLL. The frequency of each programmable PLL of clocks 48 and 56 can be independently specified by the contents of separate, multi-bit, frequency-control registers operatively coupled to each programmable PLL. By writing different bit patterns or values into the control registers of clocks 48 and 56, host processor 12 can vary the output frequency of the associated programmable PLL to which it is coupled. Software-adjustable clock sources, including programmable PLLs are known to those of ordinary skill in the art.

In the depicted embodiment, control registers of clocks 48 and 56, regulators 54, 58 and display interface 52 may be programmed by way of bus 22 by graphics processor 40 or host processor 12. Control register access is considered to be the ability to set the registers' contents. As a result of ability to access the control registers, the host processor 12 can write different values into the control registers of clock 48 and 56.

The operating voltage (Vcc) provided to graphics processor 50 is regulated by adjustable regulator 54. Regulator 54 also includes a programmable register that may be used to adjust the voltage provided by regulator 54 to graphics processor 40.

Optionally, the additional controllable back bias voltage ($V_{bb}$) is applied to graphics processor 40 by regulator 58. Regulator 58, like regulator 54, also includes a programmable register that may be used to adjust the voltage provided by regulator 54 to graphics processor 40. As will be appreciated, application of a back bias voltage to the substrate of the graphics processor 40 reduces leakage current of MOS transistors. Thus, when graphics processor 40 is formed as MOS device, application of back bias voltage may reduce power consumption of graphics processor 40.

Both VCC and Vbb may be adjusted between a low threshold voltage (e.g. 0 V) and a tolerable maximum voltage (e.g. 3.3V).

Power conservation in the graphics accelerator 20 and computing device 10 may be achieved, without sacrificing graphics processing, by matching the speeds of adjustable clocks and supply voltage so as to provide only the processing power required.

As will be appreciated, the power consumed by an active graphics accelerator 20 is directly proportional to the clock speed of the device. Those clock speeds however, determine the data processing capabilities or "bandwidth" of the graphics accelerator. Reducing the clock speeds of graphics accelerator 20 without regard to the processing expected of the graphics accelerator 20 by the software running on the host CPU, or mode settings of the operator, can adversely affect image quality on the display device 24. As a result, it is preferable to match clock speeds of graphics accelerator 20 to processing requirements, under software control (both memory and/or graphics engines) so as to preserve graphics quality without wasting power by running graphics accelerators clocks needlessly fast.

Software to change the speeds of the programmable PLL of clocks 48 and 56 typically forms part of driver software 108 supplied with the graphics accelerator 20. Alternate embodiments may include operating system software or application software (such as game software) that is capable of appropriately communicating with the control registers of clocks 48 and 56. Registers may be programmed so as to match their speed to processing requirements. As a result, the overall power consumed by graphics accelerator 20 can be changed under software control. For example, driver software of conventional graphics accelerators allow registers, controlling clocks like clocks 48, 56 and display 52 to be manually adjusted, or adjusted based on a power saving condition, including for example, system inactivity, battery mode, and the like.

An application software component may allow a user to change parameter settings, to adjust when power saving conditions are to occur, and associated power levels.

The architecture of the graphics accelerator 20 shown in FIG. 3 enables separate control of the display interface clock and the clock supplied to the graphics engine 50 thereby providing flexibility in power consumption control. One clock or the other or both can be adjusted so as optimally match performance (and adjust power consumption) to requirements. Similarly, graphics accelerator 20 allows independent control of the applied voltage to graphics processor 40.

Exemplary of embodiments of the present invention, graphics accelerator 20 further includes a hardware power consumption controller 60 that provides a clock adjustment output that allows for the dynamic adjustment of the processor clock 48. Specifically, in the depicted embodiment, power adjustment controller 60 forms part of graphics processor 40. It could, of course, be formed as a component/circuit external to graphics processor 40. Optionally, power consumption controller 60 provides a further output to adjust voltage regulator 54, and therefore regulated Vcc provided to graphics processor 40. As a further option, power consumption controller 60 provides an output to adjust back bias voltage regulator 58, and therefore regulated Vbb provided to graphics processor 40.

As will be appreciated, reduced Vcc may cause individual transistors and components of graphics processor 40 to react more slowly. At high clock speeds, such component latency may cause graphics processor 40 to function improperly. However, at reduced clock speeds, latency is tolerable and will not affect processor operation. Conveniently, a relationship between the speed of clock 40 and tolerable Vcc values may be determined in any number of ways. For example, the relationship may be determined empirically through experiment, or modelled mathematically.

Figure 4:
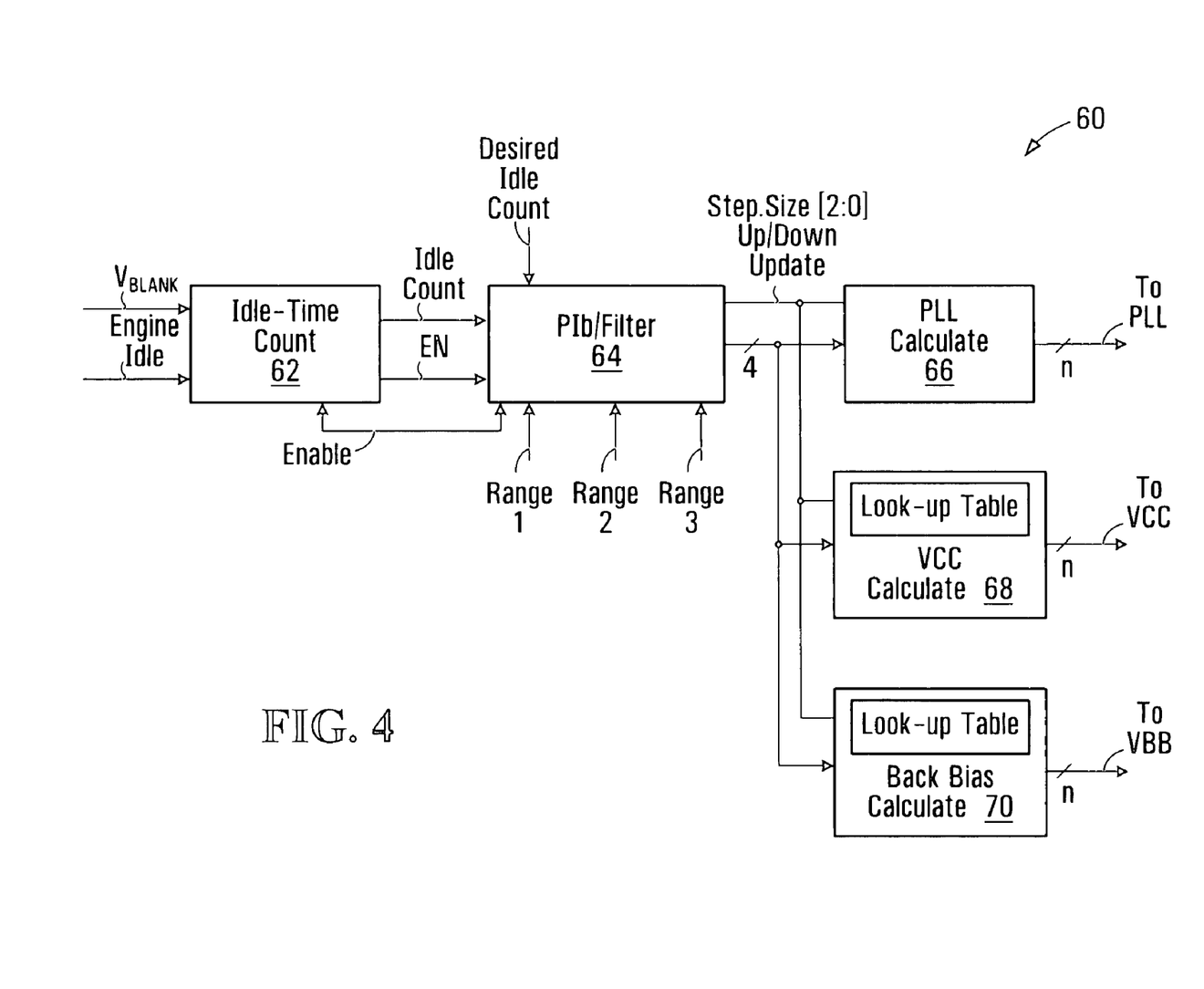
FIG. 4 is a simplified schematic block diagram of a power conservation controller of the computing device of FIG. 1, exemplary of an embodiment of the present invention.

A simplified block diagram of power consumption controller 60 is depicted in FIG. 4. As illustrated, power consumption controller 60 includes an idle time counter 62, a filter 64; and PLL parameter calculation/adjustment block 66; optional Vcc parameter calculation/adjustment block 68; and optional $V_{bb}$ parameter calculation/adjustment block 70.

Figure 7:
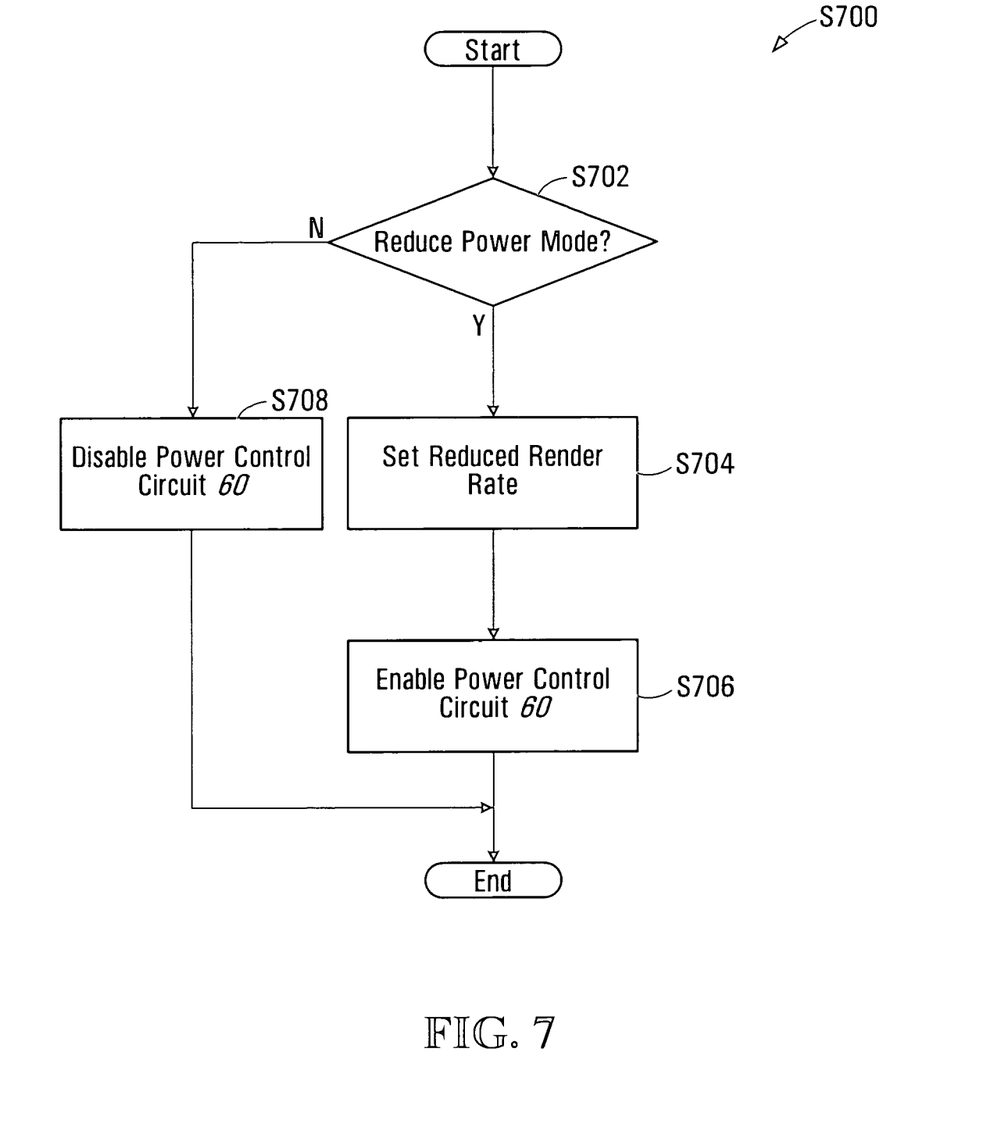
FIG. 7 is flow chart illustrating the operation of device of FIG. 1.

As noted, a portion of driver software 108 includes a power reduction code portion 112. Power reduction code portion 112, in response to detecting, directly or indirectly, that a reduced power mode is desirable may perform one of numerous set of steps. A reduced power mode may for example be desirable any time user input, in the form of keyboard, mouse or other peripheral input, has not been received for a particular duration; if power consumption is switched to a battery mode; or the like. The exact events giving rise to a desired reduced power mode may be user selected, or programmed as part of driver 108 or application software 106. In particular, software 100 may cause driver software 108 to assume a passive display mode, in which the speed of operation of graphics processor 40 is reduced so that the rate at which frames are rendered is reduced to the rate at which frames are refreshed. Additionally, power reduction code portion 112 causes host processor 12 (or graphics processor 40) to enable power consumption controller 60, in steps S700 as illustrated in FIG. 7.

Specifically, in response to determining a reduced power mode is desired in step 3702, code portion 112 adjusts or limits the frame generation/rendering rate of graphics processor 40 to an adjusted frame generation rate in step S704, if necessary. This adjusted frame generation rate is equal to or less than the frame refresh rate of a display 24 interconnected with the graphics processor 40. In the depicted embodiment, the frame rendering rate may be reduced by setting a flag that driver 108 queries and respects, thereby causing software 100 to render at the reduced rate. For example, driver 108 may await a VBLANK signal provided by display interface 52 before reversing front and back buffers and rendering a next frame in the newly designated front buffer. In effect, software 100 is slowed to render graphics in frames at a rate equal to the rate at which frames are updated on display 24.

Now, exemplary of an embodiment of the present invention, software 100 further activates power control controller 60 in step S706. Power control controller 60 further dynamically adjusts the speed of clock 48 and optionally Vcc and $V_{bb}$, so that graphics processor 40 is active for a fraction of the time between frames, in order to control the fraction of time the graphics processor 40 spends active to a known percentage set through software.

Conversely, when the reduced power mode is no longer desirable, as detected in step S702, the power controller 60 may be disabled in step S708.

Figure 5:
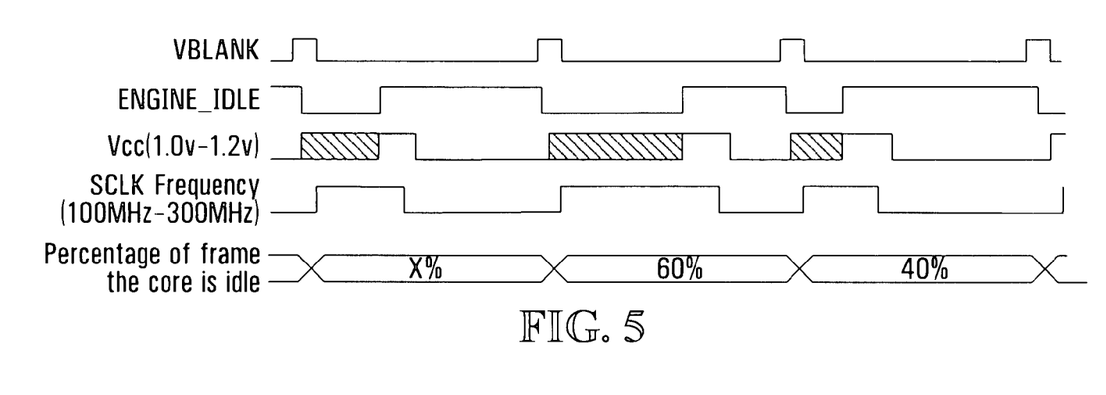
FIG. 5 is a timing diagram illustrating operation of graphics accelerator of FIG. 3 with the power conservation controller of FIG. 4 inactive.

To better appreciate the operation of power control controller 60, FIG. 5 depicts the idle time of graphics processor 40; the applied voltage Vcc; and clock transitions of clock 48, in relation to the beginning of each frame (as triggered by the vertical blanking signal—VBLANK), with power consumption control controller 60 inactive. The shaded areas in the Vcc waveform represent, very roughly, the periods of highest activity in the graphics engine 50. It should be noted that these periods coincide with Vcc being high. This essentially means that all of the useful work performed by the graphics engine 50 is done at high Vcc.

Figure 6:
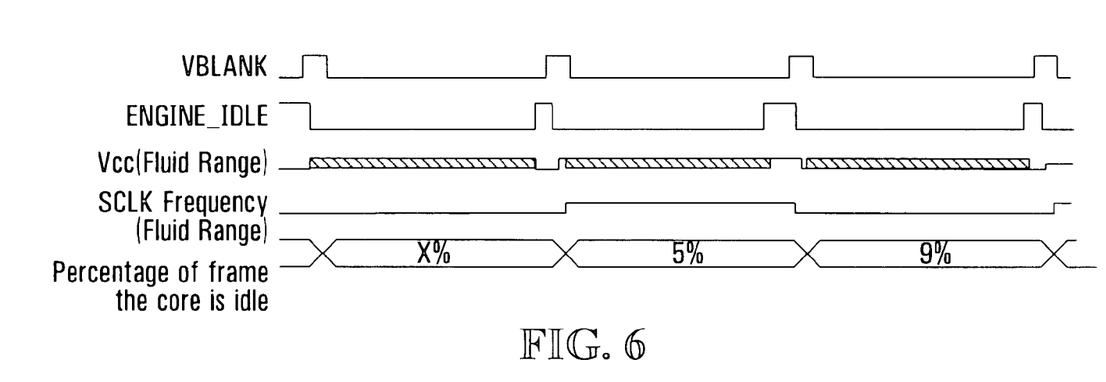
FIG. 6 is a timing diagram illustrating operation of graphics accelerator of FIG. 3 with the power conservation controller of FIG. 4 active.

Exemplary of embodiments of the present invention, SCLK frequency and Vcc are adjusted in order to change the load profile of graphics engine 50 so that the fraction of the frame the graphics engine 50 spends idle is reduced, and possibly minimized, as depicted in FIG. 6, with power consumption control controller 60 active.

The amount of processing done by the graphics engine in FIGS. 5 and 6 are the same, but spreading the processing over longer periods of time allows engine 50 to operate at lowered SCLK frequency. With a lower SCLK, Vcc may also be lowered while achieving the same performance.

As the rendering frame-rate equals the display refresh rate in both FIGS. 5 and 6, one may assume the same amount of transistor switching performed in graphics processor 40 in both modes of operation (in reality, the amount of switching would be somewhat lower for slower SCLK). Conveniently, power savings is associated with the power saving mode of operation, due primarily to reducing $V^2$ and thus $P=fCV^2$, but also due to leakage power reduction that would be prompted by lower Vcc and die temperature.

Optionally, if back-biasing is used to control leakage current, power conservation controller 60 may also include a control output to back bias voltage regulator 58 which provides the voltage to be applied to the bulk (body) connections of transistors in the core of the chip. By optimally selecting Vcc and back-bias voltage for each operating frequency energy minimization may be accomplished for any target performance level.

In order to adjust the period of the applied clock produced by PLL of clock 48, controller 60 receives a signal indicative of the activity (or inactivity) of graphics processor 40 (ENGINE$_{13}$ IDLE). Additionally, controller 60 receives a signal indicative of the vertical blanking (VBLANK), either from graphics processor 40 or interface 52. This signal also signals that a new frame should be rendered. From the IDLE signal and the VBLANK signal, controller 60 is able to calculate the percentage of each frame interval (IDLE_COUNT) in which graphics processor 50 is idle (and indirectly the percentage of each frame interval in which graphics processor 50 is active). Conveniently, IDLE_COUNT may be measured in by counting periods of a reference clock, during which the IDLE signal is asserted. The reference clock may, for example, have a fixed frequency of 100 MHz and may for example be taken from the clock of bus 22 of device 10.

Figure 8:
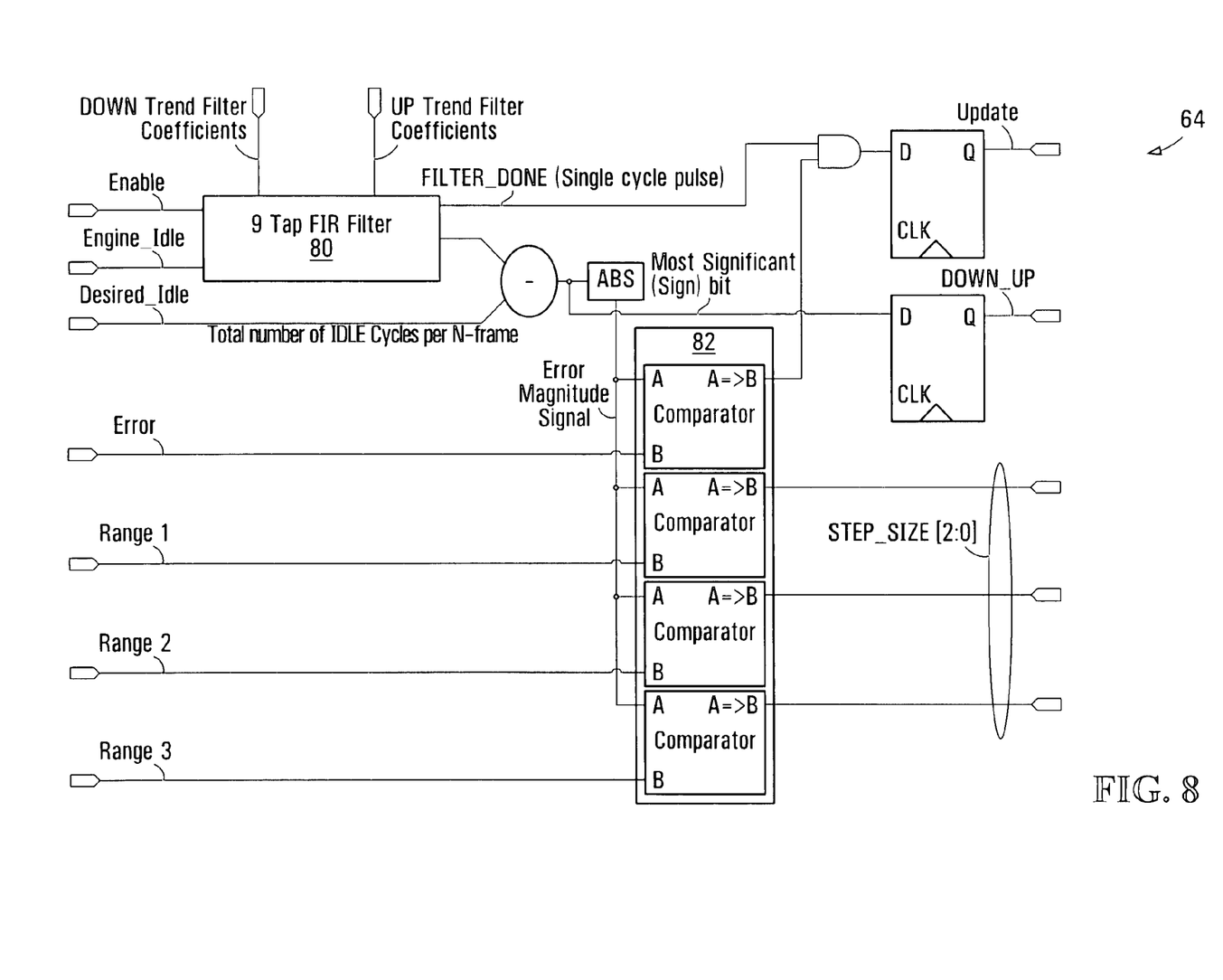
FIG. 8 is a simplified block diagram of a portion of the power conservation controller of FIG. 4.

IDLE_COUNT is further to provided to filter 64. A further block diagram of filter 64 is illustrated in FIG. 8. Filter 64 is also provided with a desired IDLE_COUNT value (DESIRED_IDLE_COUNT). The value of DESIRED_IDLE_COUNT may be stored in a register (not shown), and may be pre-programmed by power conservation code 112. Filter 64 operates as a filter in a control loop and conditions current and previous values of the error between DESIRED_IDLE_COUNT and IDLE_COUNT to calculate control outputs provided to PLL calculation block 66, $V_{cc}$ parameter calculation/adjustment block 68, and Vbb parameter calculation/adjustment block 70. In the depicted embodiment, filter 64 includes a subtractor 84 for calculating an error between the actual IDLE_COUNT and DESIRED_IDLE_COUNT. SCLK, and optionally $V_{cc}$ and $V_{bb}$ are adjusted, if required, to maintain IDLE_COUNT within a desired range. Optionally, an acceptable margin of error may be provided to filter 64. All provided values, could for example be stored in registers (not shown).

As will be appreciated, the smaller DESIRED_IDLE_COUNT, the greater the fraction of the frame refresh period, processor 40 spends rendering the frame. Ideally, the idle time for each is kept small (e.g. less that 1/10 of the frame refresh period), however, higher idle time (e.g. ½ or ¼ of the frame refresh period) may also provide benefits.

Specifically, for every period of N (1, 2, 3 or 4) displayed frames (represented by N VBLANK rising edges), IDLE_COUNT by counter 62 is provided to filter 64. This value is absolute. The absolute count of the reference clock that the graphics core spends idle may be used to approximate the percentage of a frame refresh time the graphics core spends idle. The value of IDLE_COUNT is forwarded to filter 64 along with an enable pulse, causing filter 64 to generate a signal indicating whether the frequency of clock 48 and VCC should be increased or decreased (DOWN_UP) and by how much (as represented by the signal STEP_SIZE[2:0]). A trigger pulse (UPDATE) is also provided to PLL calculate block 66 and $V_{cc}$ and $V_{bb}$ parameter calculation/adjustment blocks 68 and 70. Blocks 68 and 70 calculate blocks calculate new PLL register values and voltage regulator values based on the DOWN_UP and STEP_SIZE[2:0] inputs from filter 64. The new values are then propagated to programmable registers of clock 48, $V_{cc}$ regulator 54, and optional $V_{bb}$ regulator 58. SCLK frequency and $V_{cc}$ (and optionally $V_{bb}$) are thus gradually increased or reduced.

As should now be appreciated, SCLK and $V_{cc}$ are thus effectively controlled using discrete time feedback control with graphics engine 50 as the controlled entity. Filter 64 can thus be viewed as the block that generates the error and control signal. Filter 64 subtract the target number of idle cycles of engine 50 from the observed number and directs SCLK frequency and $V_{cc}$ to be either increased or decreased based on the sign of the error signal. A person of ordinary skill will readily appreciate, of course, that there are numerous ways to tune filter 64 to provide adequate/desired feedback control of engine 50.

In the depicted embodiment, the parameters of filter 64 are chosen to provide an appropriately damped response, providing a trade-off of response speed and undesirable oscillations around the target frequency/$V_{cc}$.

For example, example filter 64 includes a multi-tap FIR filter 80 and comparators 82 to allow adjustment of tuning step sizes, as depicted in FIG. 8.

Multi-tap FIR filter 80 provides a way of shaping the step response by taking into account a history of N previous frame periods when choosing how to adapt SCLK frequency and $V_{cc}$ for a particular frame. The FIR filter 80 may be programmed with a set of low-pass coefficients that will have a damping effect on the overall step response and suppress oscillations. Optionally, two separate sets of FIR filter coefficients may be provided; one may be applied if the observed number of IDLE cycles is increasing from frame to frame, the other if it is decreasing. For example, a low pass filter could be used as SCLK and VCC are decreased, while an less frequency selective ("all-pass") filter could be used as SCLK and $V_{cc}$ are increased. Thus SCLK and VCC would increase quickly to processing demands, but only assume an idle state more gradually. Other selections of FIR coefficients and control schemes will be readily apparent to those of ordinary skill. This allows separate control of system response to the "step-up" and "step-down" conditions.

Additionally, based on magnitude of the error signal, larger or smaller incremental changes are applied to frequency and $V_{cc}$—more error results in a larger corrective step size and vice versa. This allows response speed to be increased without undesirable oscillations and overshoot. Comparators 82 determine the error magnitude range in order to apply an appropriately sized corrective step. The error magnitude ranges, as well as the corrective step sizes for each range, could be fully programmable by values stored in registers (not shown). Again, software 108 in communication optionally interacting with power conservation code 112 may be used to program the values stored in these registers to allow for software/user optimization of the operation of graphics accelerator 20.

PLL calculate block 66 (FIG. 4) uses the produced step size value (STEP_SIZE) and up/down output (DOWN_UP) to calculate new values for register of clock 48. Specifically, PLL calculate block 66 may convert the step size value into an appropriate clock adjustment value using a linear or non-linear function. Vcc parameter calculation/adjustment block 68 may similarly determine a voltage value and convert this to a register value to be placed in the register.

$V_{cc}$ parameter calculation/adjustment block 68 may a use a look-up table that provides suitable $V_{cc}$ register values for each possible SCLK value. Alternatively, $V_{cc}$ may calculate a $V_{cc}$ adjustment based on the SCLK adjustment value. In essence, $V_{cc}$ is adjusted based on the value of SCLK.

Additionally, for any value of $V_{cc}$ and SCLK, an optimal back-bias value of $V_{bb}$ may be chosen. Thus $V_{bb}$ parameter calculation/adjustment block 70 may use a look-up table or function to determine a suitable value to be placed in the control register for regulator 58.

As will be appreciated, optimal combinations of SCLK, $V_{cc}$ and $V_{bb}$ will depend on the exact nature (i.e. number and arrangement of transistors, layout, etc.) of graphics processor 40 and may be empirically determined. Look-up tables of blocks 68 and 70 may be determined accordingly.

Conveniently, controller 60 reduces consumed power while device 10 and graphics accelerator 20 are rendering images at a prescribed frame rate. This form of power reduction is particularly well suited to reducing power consumed during active rendering, and does not rely on the computing device assuming an idle state. Of course, controller 60 could be disabled any time high speed graphics processing is required.

As will be appreciated, the above embodiments have been described with reference to a single graphics processor that renders all displayed graphics. The invention could similarly be used with multiple graphics processors sharing the load, with each processor rendering a subset of the total displayed frames. The frame rendering rate of each graphics processor would accordingly be limited to a fraction of the frame refresh rate of any associated display.

Of course, the above described embodiments are intended to be illustrative only and in no way limiting. Specific arrangements of hardware and software have been described. However, as will be apparent to those of ordinary skill, steps performed in hardware could be performed in software, logical functions could be combined, and orders of operation could be altered.

The described embodiments of carrying out the invention are susceptible to many modifications of form, arrangement of parts, details and order of operation. The invention, rather, is intended to encompass all such modification within its scope, as defined by the claims.

What is claimed is:

1. A method of operating a graphics accelerator comprising:
    operating a graphics processor to render frames in frame buffer memory at a frame rendering rate that exceeds a frame refresh rate of a display interconnected with said graphics processor;
    sampling said frame buffer memory at said frame refresh rate to display graphics on said display at said frame refresh rate, wherein at said frame rendering rate, the number of frames rendered exceeds the number of frames displayed on said display;
    in response to detecting a desired reduced power mode, adjusting under software control, said frame rendering rate of said graphics processor to an adjusted frame rendering rate equal to or less than said frame refresh rate, and rendering graphics to be displayed on said display in said frame buffer memory, at said adjusted frame rendering rate, without adjusting said frame refresh rate;
    controlling said frame rendering rate of said graphics processor so that idle time of said graphics processor between rendering frames at said adjusted frame rendering rate is controlled.

2. The method of claim 1, wherein said controlling comprises controlling operation of said graphics processor so that idle time of said graphics processor reaches a pre-programmed value.

3. The method of claim 2, wherein said pre-programmed value is less than ½ of a period of said frame refresh rate.

4. The method of claim 2, wherein said pre-programmed value is less than ¼ of a period of said frame refresh rate.

5. The method of claim 2, wherein said pre-programmed value is less than 1/10 of a period of said frame refresh rate.

6. The method of claim 1, wherein said controlling further comprises adjusting a clock frequency of an operating clock of said graphics processor.

7. The method of claim 6, wherein said operating clock is an operating clock for a graphics engine of said graphics processor.

8. The method of claim 7, wherein said controlling further comprises adjusting a supply voltage to said graphics engine of said graphics processor.

9. The method of claim 8, wherein adjusting said supply voltage comprises using a look-up table to determine a voltage in dependence on said clock frequency.

10. The method of claim 7, further comprising adjusting a bias voltage applied to a substrate of said graphics processor.

11. The method of claim 10, wherein adjusting said bias voltage comprises using a look-up table to determine a back bias voltage in dependence on at least one of said clock frequency and said supply voltage.

12. The method of claim 6, further comprising generating a signal indicative of said graphics processor idling, and wherein said controlling comprises generating an error signal representative of the desired idle time, and the actual idle time of said graphics processor.

13. The method of claim 12, further comprising filtering said signal indicative of said graphics processor idling to generate a control signal for controlling said operating clock of said graphics processor.

14. The method of claim 13, wherein said filtering comprises filtering said signal indicative of said processor idling signal using an N-tap FIR filter.

15. The method of claim 1, wherein said adjusting under software control a frame rendering rate of a graphics processor to an adjusted frame rendering rate comprises waiting for a vertical blank signal before rendering a next frame.

16. A graphics accelerator comprising:
    a graphics engine for rendering graphical images to be displayed on a display;
    an adjustable clock source, for providing an operating clock signal to said graphics engine;
    frame buffer memory;
    a display interface for sampling said frame buffer memory at a frame refresh rate, to display graphics on said display at a frame refresh rate;
    said graphics engine operable under software control to render frames at a first frame rendering rate that exceeds said frame refresh rate to said frame buffer memory, and, in response to detecting a desired reduced power mode, at a reduced second frame rendering rate equal to or less than said frame refresh rate, without adjusting said adjustable clock source and without adjusting said frame refresh rate;
    a controller in communication with said graphics engine and said adjustable clock, to control a frequency of said adjustable clock source so that said graphics engine remains idle for a defined time between frames as said graphics engine renders frames at said reduced second frame rendering rate.

17. The graphics accelerator of claim 16, further comprising a controllable voltage supply to supply an operating voltage to said graphics engine, and wherein said controller is further in communication with said controllable voltage supply to adjust said operating voltage in dependence on said frequency of said adjustable clock source.

18. The graphics accelerator of claim 17, further comprising a second controllable voltage supply to supply a back bias voltage to a substrate of said graphics engine, and wherein said controller is further in communication with said controllable voltage supply to adjust said back bias voltage in dependence on at least one of said frequency of said adjustable clock source and said operating voltage.

19. The graphics accelerator of claim 18, wherein said controller comprises a multi-tap FIR filter to filter idle time over multiple frames.

20. The graphics accelerator of claim 17, further comprising a look-up table used to determine said operating voltage.

21. The graphics accelerator of claim 18, further comprising a look-up table used to determine said back bias voltage.

22. The graphics accelerator of claim 18, wherein said controller adjusts said clock in increments, and wherein said increments vary in dependence on said error.

23. A computing device comprising the graphics accelerator of claim 16.

24. A computing device comprising:
frame buffer memory;
means for rendering graphics frames to said frame buffer memory at a frame generation rate;
an adjustable clock source, for providing an operating clock signal to said graphics engine;
means for sampling said frame buffer memory at a frame refresh rate, to display graphics on said display at said frame refresh rate;
means for, in response to detecting a reduced power condition, limiting said frame generation rate from a rate that exceeds said frame refresh rate to an adjusted frame generation rate equal to or less than said frame refresh rate, without adjusting said adjustable clock source and without adjusting said frame refresh rate;
means for controlling operation of said adjustable clock source so that idle time of said means for rendering between rendered frames at said adjusted frame rate is reduced.

* * * * *